United States Patent [19]
Ericksen et al.

[11] Patent Number: 5,507,607
[45] Date of Patent: Apr. 16, 1996

[54] INTEGRATED DRAWER SIDE TOOL

[76] Inventors: Colin Ericksen, 110 W. 6th Ave. #177, Ellensburg, Wash. 98926; Richard Hardwick, 2595 Daisy La., Fallbrook, Calif. 92028; Jeffrey Asher, 12544 Kirkham Ct. #12, Poway, Calif. 92064

[21] Appl. No.: 407,904

[22] Filed: Mar. 20, 1995

[51] Int. Cl.⁶ .................................................. B23B 49/02
[52] U.S. Cl. ...................... 408/108; 408/115 R
[58] Field of Search ........................ 408/72 R, 88, 408/97, 103, 108, 115 R, 115 B, 241 B

[56] References Cited

U.S. PATENT DOCUMENTS

| | | | |
|---|---|---|---|
| 2,341,107 | 2/1944 | MacDonald | 408/115 R |
| 2,342,033 | 2/1944 | Barabos | 408/115 R |
| 3,788,759 | 1/1974 | Grunert | 408/115 R |
| 5,064,319 | 11/1991 | Ericksen | 408/115 R |

FOREIGN PATENT DOCUMENTS

| | | | |
|---|---|---|---|
| 2848937 | 5/1980 | Germany | 408/115 R |
| 796057 | 6/1958 | United Kingdom | 408/115 R |

OTHER PUBLICATIONS

Drawer Assembly Machine.

*Primary Examiner*—Daniel W. Howell

[57] ABSTRACT

The present invention is a device for locating fastener positions and is more particularly concerned with the aspect of precise location for removal of material by boring or drilling by means of a hand held electric drill motor or drill press.

5 Claims, 3 Drawing Sheets

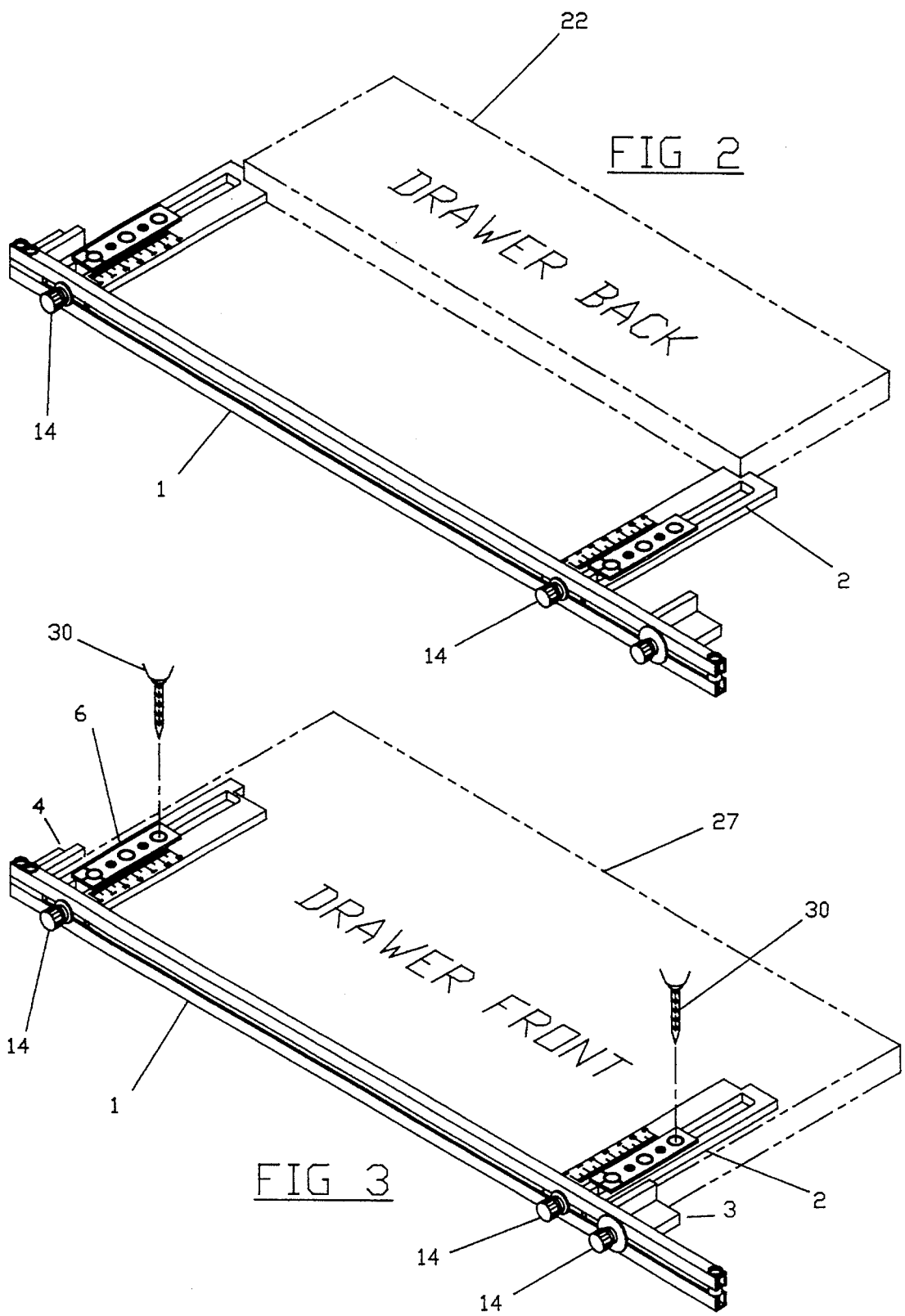

INTEGRATED DRAWER SIDE TOOL

FIELD OF INVENTION

This invention relates to Cabinetry Drawer Construction, involving the use of an integrated drawer side and drawer roller combination. The drawer roller assembly also forms the drawer side. To attach the combination drawer side and drawer roller assembly to a drawer front, requires the precise location of pilot holes for screws or dowel ribbed fasteners. The placement of the pilot hole locations must be adjustable to the requirements of the user.

DISCUSSION OF PRIOR ART

Current methods of assembling integrated drawer slides, involves large clamping fixtures. These fixtures temporally hold the drawer components together while providing drilling locations for the fasteners. These machines are very expensive and require expensive floor space to set up and use. These disadvantages put the purchase of these machines beyond the financial capabilities of most potential users of integrated drawer slides. Tile present invention is developed to produce an effective system that is adjustable for hole locations to accurately drill material to receive the integrated drawer slide hardware fasteners.

SUMMARY OF THE INVENTION

The present invention is a machine accessory to be used with boring or drilling devices, such as a drill press or hand held electric drill motor.

An object of the invention is two parallel channel guide rail members, having connecting fastener holes at each end.

A further object of the invention is the channel guide rail members face each others open side.

A still further object of the invention is attachment of the guide rail members through the provided holes with fasteners. The rail members spaced apart by a spacer on one end and a fixed positioning stop on the other end, forming a closed raceway guide.

Another object of the invention is washers captured between the rail members, of a size to move freely in the closed raceway guide.

A further object of the invention is the fixed positioning stop acts as a positioning reference point, to position a workpiece.

A still further object of the invention is a scale provided on one side of the rail member, in such a manner as to be used with a reference line on the template assembly, adjacent to the fixed positioning stop.

Another object of the invention is a sliding stop operating between the rail member spacer and a second template assembly, to capture a workpiece between the fixed positioning stop, the sliding stop and the guide rail member.

A further object of the invention is an intermittent clamping means provided on the sliding stop to position the stop at a desired location along the rail members. A still further object of the invention is a guiding slot provided on each template.

Another object of the invention is a drill guide assembly, comprising two components so that when placed together in the provided slot, the slot becomes a guide to the two components.

A further object of the invention is the provision of fasteners to hold the drill guide assembly components together and act as an intermittent clamping means to affix the assembly at a desired location within the parameters of the slotted guide.

Another object of the invention are drill guide bushings in the drill guide assembly, to guide a drill bit into contact with a workpiece. A further object of the invention is an indexing scale on each template.

A still further object of the invention is a reference line on each drill guide assembly, to use in conjunction with the indexing scale. By loosening the intermittent clamping screws, the elevation of the drill guide assembly can be adjusted to a desired setting on the indexing scale, while maintaining the spacing between drill guide bushings.

Another object of the invention are notches on one corner of each template. By first setting the location of the template adjacent the fixed stop, using the index scale on the guide rail and reference line on the template, then placing the drawer back between the notches of the templates, the second template is automatically positioned.

A further object of the invention is an auxiliary locator, comprising a T shaped member, complete with a fixed stop and drill guide means to locate and drill the fastener position of the drawer back. Another object of the invention is that the tool is portable. A further object of the invention is the tools efficiency. A still further object to the invention is that the tool is inexpensive.

BRIEF DESCRIPTION OF THE DRAWINGS

Other objects and advantages of the invention will become more apparent from the specification taken in conjunction with the accompanying drawings in which:

FIG. 2 is a perspective view of the drawer front drilling assembly showing the drawer back being used to set template 2 of the drawer front assembly. FIG. 3 is a perspective view of the drawer front drilling assembly placed on the drawer front for the fastener drilling operation.

DETAILED DESCRIPTION OF THE INVENTION

Figure 1:
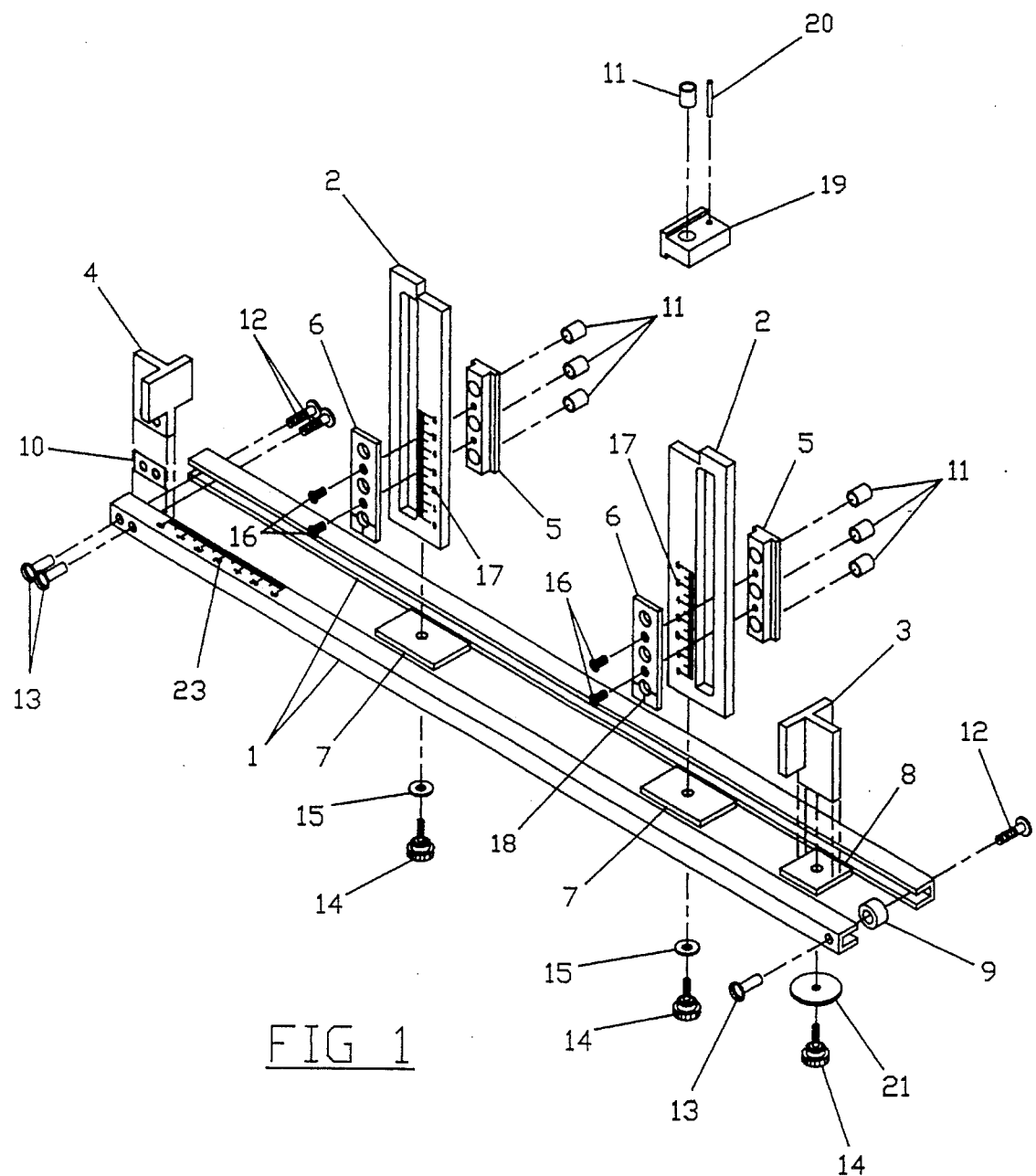
FIG. 1 is an exploded perspective view of the drawer front drilling assembly and the drawer back drilling assembly, together forming the integrated drawer slide tool.

Referring to FIG. 1, numeral 1 are channel members facing one another to form a race way to capture washers 7 & 8. Channel members 1 spaced apart by fixed foot 4 and spacer 10 at one end and by spacer 9 at the opposite end. The channel members being attached together by fasteners 12 and 13 passing thru holes in channel numbers 1 and holes in spacer 10, fixed foot 4 and spacer 9, forming a closed raceway assembly.

Adjustable foot 3 is intermittently located along the raceway assembly by means of a hand knob 14 with a threaded stud passing thru washer 21. Washer 21 in combination with washer 8 captures a wall side of a channel members 1 when the stud portion of hand nob 14 is threaded into a threaded hole in adjustable foot 3, thereby intermittently affixing the adjustable foot at a desired location along channel members 1. Templates 2 are provided with a threaded hole to accept the stud portion of hand knob 14, passing thru washer 15 and washer 7 thereby capturing a wall side of channel number 1, to intermittently clamp template 2 at desired locations along the raceway assembly.

Templates 2 constructed with a slotted raceway to accept a T shaped drill guide locator 5, complete with drill guide bushings is retained by clamping plate 6 and clamping screws 16, to capture template 2 when screws 16 are tightened. Clamping plate 6 having a reference line for setting the elevation of guide locator 5 using the indexing scale 17 provided on templates 2.

Clamping plate 6 having reference line 18, to set the distance from the face of fixed foot 4, by use of indexing scale 23.

Drawer back drilling fixture 19 constructed of T shaped material, so as to form a stop when placed on a work piece, complete with a locating pin 20 and drill guide bushing 11.

Referring to FIG. 2, template 2 is automatically being positioned by employing the drawer back in the notches of the templates.

Referring to FIG. 3, the drawer front drilling assembly is positioned on a drawer front after being set up by use of the indexing scale on channel member 1, the indexing scales on templates 2 and following the procedure in FIG. 2. The drawer front is captured between fixed foot 4 and adjustable foot 3, to prevent movement during the drill operation.

Figure 4:
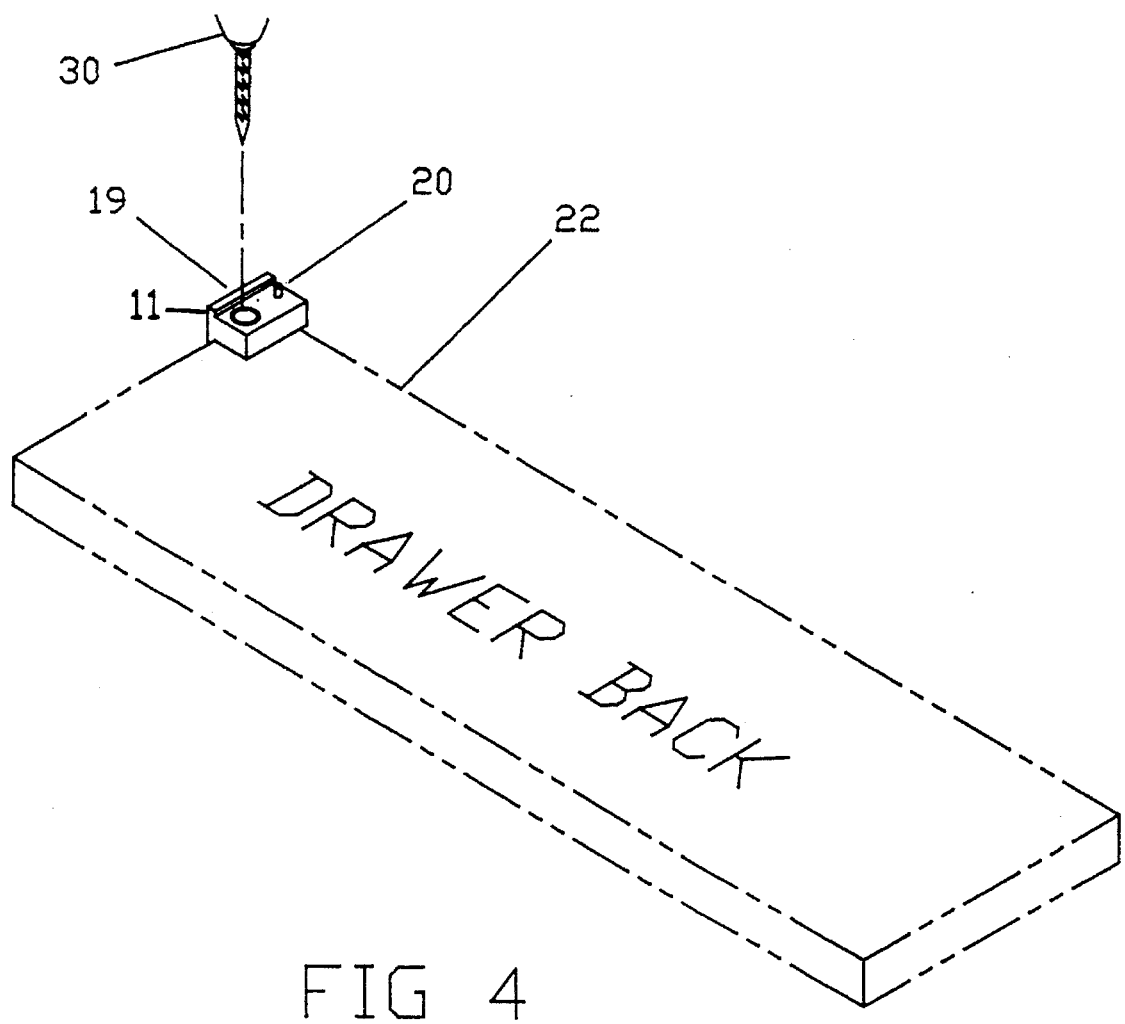
FIG. 4 is a perspective view of the drawer back drilling assembly placed on a drawer back for the fastener drilling operation.

Referring to FIG. 4, the drawer back drilling assembly is position on a corner of drawer back 22 using the T shaped edge of base 19 and stop pin 20 to correctly locate drill guide bushing 11 to guide drill bit 30 into contact with back 22.

We claim:

1. A drill guide assembly for locating holes for hardware on a drawer back and a drawer front, comprising:

two parallel guide rail members, said guide rail members being positioned apart by a spacing means at one end and a fixed foot on the opposite end, an adjustable foot slidable between said guide rail members adjacent said one end, a plurality of templates slidably mounted on said guide rail members between said fixed foot and said adjustable foot, said templates each having drill guide means and a corner indexing notch.

2. A drill guide assembly as set forth in claim 1, further comprising a back drilling fixture having two perpendicular portions, one of said portions having a drill guide means and a pin extending parallel to the drill guide means for locating the back drilling fixture relative to an edge of a workpiece.

3. A drill guide assembly as set forth in claim 1, wherein said drill guide means are adjustably mounted on said templates, and means are provided for locking the drill guide means in desired locations on the templates.

4. A drill guide assembly as set forth in claim 3, wherein said templates have indexing scales to aid in adjusting the positions of the drill guide means.

5. A drill guide assembly as set forth in claim 1, wherein at least one of said guide rail members has an indexing scale.

* * * * *